(12) United States Patent
Iannello et al.

(10) Patent No.: US 7,250,734 B1
(45) Date of Patent: Jul. 31, 2007

(54) HIGH PERFORMANCE SWITCHED RELUCTANCE MACHINE

(75) Inventors: Victor Iannello, Roanoke, VA (US); Robert Jett Field, Fincastle, VA (US); Christopher K. Sortore, Roanoke, VA (US)

(73) Assignee: Synchrony, Inc., Roanoke, VA (US)

( * ) Notice: Subject to any disclaimer, the term of this patent is extended or adjusted under 35 U.S.C. 154(b) by 0 days.

(21) Appl. No.: 10/855,821

(22) Filed: May 27, 2004

Related U.S. Application Data

(60) Provisional application No. 60/473,571, filed on May 27, 2003.

(51) Int. Cl.
H02K 19/06 (2006.01)
H02K 7/09 (2006.01)

(52) U.S. Cl. .................... 318/254; 310/168; 310/90.5

(58) Field of Classification Search .............. None
See application file for complete search history.

(56) References Cited

U.S. PATENT DOCUMENTS

| | | | | |
|---|---|---|---|---|
| 4,450,396 A | * | 5/1984 | Thornton | 318/721 |
| 4,896,088 A | | 1/1990 | Jahns | |
| 5,424,595 A | * | 6/1995 | Preston et al. | 310/90.5 |
| 5,672,925 A | * | 9/1997 | Lipo et al. | 310/154.11 |
| 5,677,586 A | * | 10/1997 | Horst | 310/103 |
| 5,739,662 A | * | 4/1998 | Li | 318/701 |
| 5,780,949 A | * | 7/1998 | Li | 310/198 |
| 5,811,905 A | * | 9/1998 | Tang | 310/179 |
| 5,866,964 A | * | 2/1999 | Li | 310/198 |
| 5,880,549 A | * | 3/1999 | Chiba et al. | 310/168 |
| 5,894,210 A | | 4/1999 | Brown | |
| 5,923,142 A | * | 7/1999 | Li | 318/701 |
| 5,936,370 A | | 8/1999 | Fukao | |
| 5,955,811 A | | 9/1999 | Chiba | |
| 6,140,729 A | * | 10/2000 | Pollock et al. | 310/166 |
| 6,181,092 B1 | | 1/2001 | Turner | |
| 6,351,048 B1 | * | 2/2002 | Schob et al. | 310/90.5 |
| 6,359,356 B1 | * | 3/2002 | Hayashi | 310/90.5 |
| 6,441,580 B2 | | 8/2002 | Marcinkiewicz | |
| 6,465,923 B2 | * | 10/2002 | Amrhein | 310/90.5 |
| 6,509,710 B2 | * | 1/2003 | Grasso et al. | 318/701 |
| 6,559,567 B2 | * | 5/2003 | Schob | 310/90.5 |
| 6,727,618 B1 | * | 4/2004 | Morrison | 310/90.5 |

(Continued)

OTHER PUBLICATIONS

Arkadan, A. A. and Kielgas, B. W., Switched Reluctance Motor Systems Dynamic Performance Prediction and Experimental Verification, Mar. 1994, IEEE Transactions of Energy Conversion, vol. 9, No. 1, 36-44.*

(Continued)

*Primary Examiner*—Lincoln Donovan
*Assistant Examiner*—Robert W. Horn
(74) *Attorney, Agent, or Firm*—Michael Haynes PLC; Michael N. Haynes; Dale R. Jensen

(57) ABSTRACT

Certain exemplary embodiments can provide a switched reluctance machine, comprising a rotor; and a stator encircling said rotor and comprising a plurality of radially distributed stator poles, each of said stator poles comprising a set of coils, each set of coils comprising: a phase coil adapted to be switched to affect a rotation of said rotor; and a field excitation coil adapted to, while said rotor is rotating, generate a magnetic field from a received excitation current.

24 Claims, 7 Drawing Sheets

U.S. PATENT DOCUMENTS

| | | | |
|---|---|---|---|
| 6,731,083 B2* | 5/2004 | Marcinkiewicz | 318/254 |
| 6,787,958 B1* | 9/2004 | Walter | 310/168 |
| 6,801,012 B1* | 10/2004 | Islam et al. | 318/701 |
| 6,819,008 B2* | 11/2004 | Kaplan et al. | 290/44 |
| 6,822,355 B2* | 11/2004 | Karrelmeyer et al. | 310/68 B |
| 6,853,163 B2* | 2/2005 | Slater | 318/700 |
| 6,867,561 B1* | 3/2005 | Pollock et al. | 318/254 |
| 6,879,074 B2* | 4/2005 | Amrhein et al. | 310/90.5 |
| 2001/0024099 A1 | 9/2001 | Greif | |
| 2002/0047401 A1* | 4/2002 | Schoeb | 310/90.5 |
| 2002/0093263 A1* | 7/2002 | Amrhein | 310/90.5 |
| 2002/0105241 A1* | 8/2002 | Carroll et al. | 310/90.5 |
| 2002/0149331 A1 | 10/2002 | Marcinkiewicz | |
| 2004/0066105 A1* | 4/2004 | Kim | 310/90.5 |
| 2005/0077793 A1* | 4/2005 | Garvey et al. | 310/90.5 |

OTHER PUBLICATIONS

Omekanda, A. M., Broche, C. and, Renglet, M., Calculation of the Electronic Parameters of a Switched Reluctance Motor Using an Improved FEM-BIEM, Jul./Aug. 1997, IEEE Transactions on Industry Apps, vol. 33, No. 4, 914-918.*

Takemoto, M., Hitoshi S., and Chiba, A., Fukao, T. and Rahman, M.A., Improved Analysis of a Bearingless Switched Reluctance Motor, Jan./Feb. 2001, IEEE Transactions on Industry Apps, vol. 37, No. 1, 26-34.*

* cited by examiner

HIGH PERFORMANCE SWITCHED RELUCTANCE MACHINE

CROSS-REFERENCES TO RELATED APPLICATIONS

This application claims priority to, and incorporates by reference herein in its entirety, pending U.S. Provisional Patent Application Ser. No. 60/473,571, filed 27 May 2003.

BRIEF DESCRIPTION OF THE DRAWINGS

The invention and its wide variety of potential embodiments will be more readily understood through the following detailed description, with reference to the accompanying drawings in which.

DEFINITIONS

Figure 1:
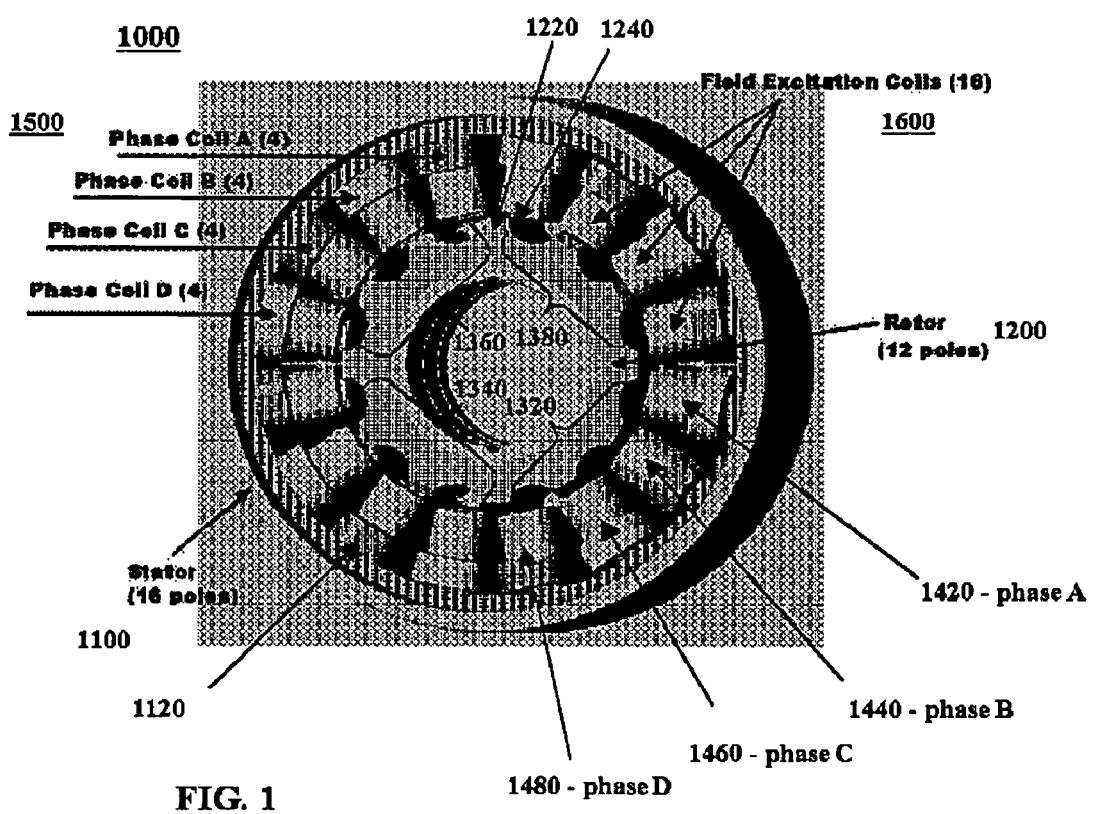
FIG. 1 is a front perspective view of an exemplary embodiment of a machine 1000.

When the following terms are used herein, the accompanying definitions apply:

affect—to have an influence on or effect a change in.

automatically—acting or operating in a manner essentially independent of external influence or control. For example, an automatic light switch can turn on upon "seeing" a person in its view, without the person manually operating the light switch.

back EMF—an induced voltage.

coil—a continuous loop of two or more turns of wire.

collinear—occurring along a common line.

comprising—including but not limited to.

conductor-free—marked by an absence of a electrically conductive elements adapted to flow an induction current induced by a rotating magnetic flux.

co-radial set—a plurality, each of which is located along a common radius of a circle.

diametrically opposed—at least two elements of an object that are positioned opposite one another along a diameter of the object.

firmware—machine-readable instructions that are stored in a read-only memory (ROM). ROM's can comprise PROMs and EPROMs.

I/O device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

Internet—an interconnected global collection of networks that connect information devices.

iteration—a repetition.

machine-readable medium—a physical structure from which a machine can obtain data and/or information. Examples include memory devices, punch cards, etc.

magnetic field—a the portion of space near a magnetic body or a current-carrying body in which the magnetic forces due to the body or current can be detected.

magnetomotive force—a force that produces magnetic flux.

memory device—any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and can store instructions adapted to be executed by the processor according to an embodiment disclosed herein.

near-optimal—an approximation that minimizes an error.

network—a communicatively coupled plurality of communication devices. Examples include local area networks, telecommunication networks, the Internet, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

non-sinusoidally—in a pattern and/or via a waveform that does not substantially resemble a sine wave.

phase—a number of portions of a complete rotational cycle of a machine. Also, a fraction of a complete cycle elapsed as measured from a specified reference point and often expressed as an angle.

pole—one of two or more regions in a magnetized body at which the magnetic flux density is concentrated.

processor—a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

quasi-steady current—a current that is of a substantially constant and non-zero amperage value.

radially distributed—located at equally spaced positions around a circumference of a circle.

rotor—a rotating portion of a machine.

sector—a portion of a circle bounded by two radii and the included arc.

set—a plurality.

stator—a stationary portion of a machine.

subgroup—a portion of a plurality.

switch—electrically energize or de-energize.

switched reluctance machine—a rotating electric machine where both stator and rotor have salient poles and lack permanent magnets. Each stator pole comprises at least one coil. The stator poles are arranged in phases, the corresponding coils for which are electronically switched to produce a moving magnetic field, which the rotor follows in synchronism.

system—a collection of devices and/or instructions, the collection designed to perform one or more specific functions.

time-dependent—varying with respect to time.

user interface—any device for rendering information to a user and/or requesting information from the user. A user interface includes at least one of textual, graphical, audio, video, animation, and/or haptic elements.

DETAILED DESCRIPTION

Certain exemplary embodiments can provide a high performance Switched Reluctance Machine (SRM) used as a motor, generator, and/or radial bearing. Certain embodiments can have applicability as either an electric generator or as an Integral Starter-Generator (ISG) for electrical power systems in airborne, marine, and terrestrial power systems. Using a novel electromagnetic structure, winding pattern, control scheme, and power electronics, certain embodiments can promise a 20% reduction in weight of the electromechanical components (rotor and stator) and a 33% reduction in weight of the power electronics. Additionally, certain embodiments can be used to exert a radial force on the rotating structure, thereby augmenting or replacing the performance of a proximate radial bearing. The performance of certain embodiments has already been experimentally demonstrated.

Certain exemplary embodiments of the SRM can be well suited for high speed, high temperature applications such as gas turbine engines because they can offer:

High speed rotor. The rotor of the SRM can be comprised of a stack of washer laminations with salient poles. There are typically no rotor windings or conductor bars such as found in induction motors, and thus the rotor can be conductor-free.

High temperature design. With the absence of permanent magnets in the stator or rotor, temperature is limited only by the magnetic properties of the lamination materials and by the insulation used in the coil windings.

High efficiency. The SRM can be designed for efficiencies of greater than 90%, and is inherently of higher efficiency than induction motors.

Inherent fault tolerance. The SRM can be designed with 3 or more independent phases of electrical channels.

We have developed embodiments of an advanced SRM in which an advanced magnetic structure and electronic controller simultaneously produce torque and radial force. The embodiments of the advanced SRM differ from other SRMs in any of several manners, including the use of two or more sets of coils on each pole in the advanced SRM.

Figure 2:
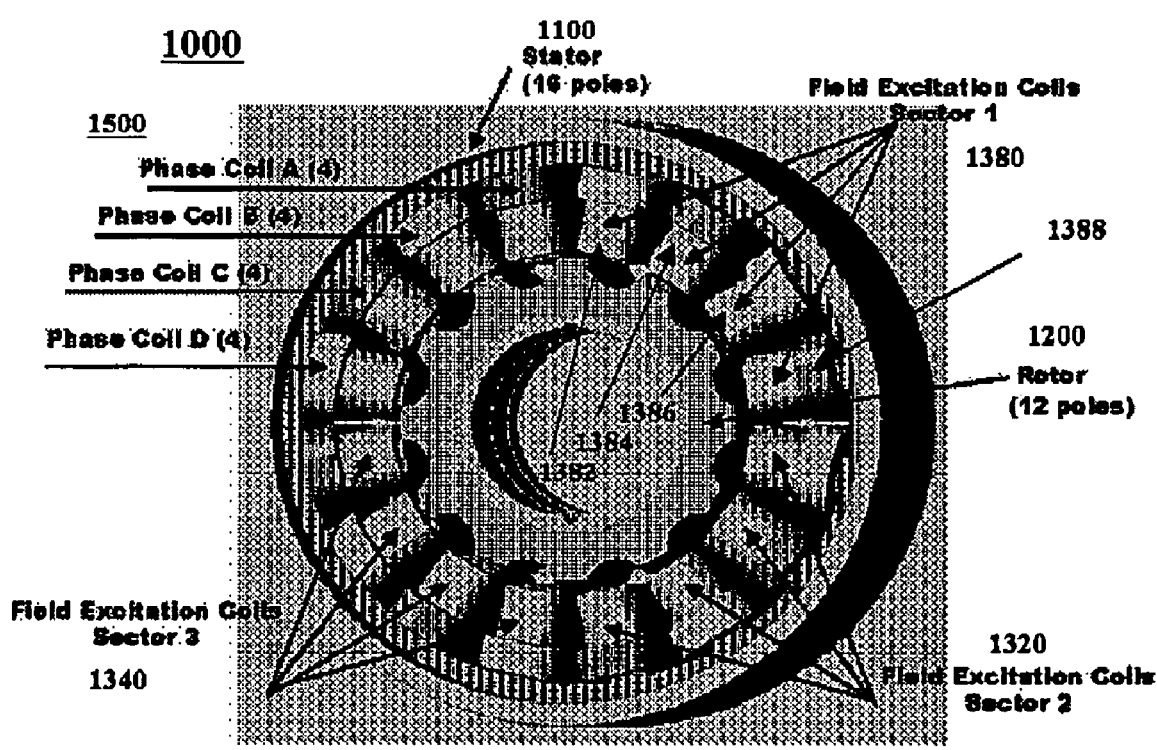
FIG. 2 is a front perspective view of an exemplary embodiment of a machine 1000.

FIGS. 1 and 2 are front perspective views of an exemplary embodiment of a switched reluctance machine 1000, comprising a rotatable shaft called a rotor 1200, which comprises 12 rotor poles 1220.

Shown also is a stator 1100 comprised of a plurality of stator poles 1120, in this case 16 stator poles, which are grouped as four sectors 1320, 1340, 1360, 1380, each sector comprising four stator poles (e.g., 1420, 1440, 1460, 1480). Each stator pole in a sector can be assigned one of four possible phases (e.g., stator pole 1420 is phase A, stator pole 1440 is phase B, stator pole 1460 is phase C, stator pole 1480 is phase D). Each of the plurality of stator poles 1120 can comprise a co-radial set of coils, that set comprising at least one coil that functions as a "phase coil" 1500 and at least another coil that functions as a "field excitation coil" 1600.

Phase coils 1500 can be connected to power amplifiers (shown in FIG. 3) for each phase, which can provide switching signals for causing phrase coils 1500 to create a rotating magnetic field in stator 1100 that induces a rotation of rotor 1200.

Field excitation coils 1600 can create a magnetomotive force (MMF) between stator poles 1120 and rotor 1200 that results in a changing magnetic field due to the change in air gap 1240 as a rotor pole 1220 passes a stator pole 1120. The field excitation coils 1600 can be connected in series, and the current in these coils can be quasi-steady. When the excitation current is applied and shaft 1200 is rotating, the excitation current can create a time-dependent magnetic field that induces a back EMF in phase coils 1500 that augments the electromagnetic performance of SRM 1000.

To produce a radial force in an arbitrary radial direction, field excitation coils 1600 can be segmented into three or more sectors. FIG. 2 shows a particular implementation using a 16-pole stator 1200 in which the field excitation coils 1600 are grouped into quadrants (i.e., four sectors 1320, 1340, 1360, and 1380). The four field coils in each sector can be connected in series. Thus, considering an exemplary sector 1380, the four field coils (i.e., 1382, 1384, 1386, 1388) within sector 1380 can be connected in series. The current in each sector may be independently controlled. By differentially exciting sectors and/or poles across a diameter (i.e., those that are diametrically opposed), a radial force can be produced along that diameter, i.e., the rotor is magnetically attracted toward the sector and/or poles with the higher excitation current.

The SRM can be designed so that a nearly constant current can be easily maintained in the field coils using a simple, small amplifier. For example, the symmetry of a 16/12 machine may be exploited so that the back EMF of the different poles within a sector tend to cancel when those coils are electrically connected in series, and the ripple in the field current may be kept small. Therefore, the power rating of the amplifiers that supply the excitation currents needs only be equal to the small amount of resistive power loss that is dissipated in the field coils.

When the SRM is operating as a generator, there are three possible modes of operation:

Switched. In this mode, current in the field excitation coils is zero, and the SRM functions as a conventional SRM. One or more sensors detect the angular position of the shaft, and this position signal is used to time the turn-on and turn-off of power transistors that apply the DC bus voltage to the phase coils. The switching frequency for each phase is equal to the rotational speed times the number of rotor poles.

Unswitched. In this mode, the power transistors in the phase amplifiers are not actively switched. Current is applied to the field coils, and the back EMF induced in the phase coils is rectified and delivered to the DC bus. The advantage of this mode is that during power generation, no active switching is required, no angular position sensing is required, and the field coils may be grouped by sector to produce controllable radial forces to augment or replace the performance of a proximate bearing. The disadvantage is that less power is generated for the same sized SRM than for the switched configuration.

Hybrid. In this mode, the power transistors in the phase amplifiers are switched on and off based on the angular position of the shaft, as for the switched configuration of operation. Additionally, current is applied to the field excitation coils, as for the unswitched mode. The back EMF induced by this field excitation augments the bus voltage applied by switching. The power produced by the SRM and electronics is therefore increased. Just as for the unswitched configuration, field coils may be grouped by sector to produce controllable radial forces to augment or replace a proximate radial bearing.

Electronic Controller

Figure 3:
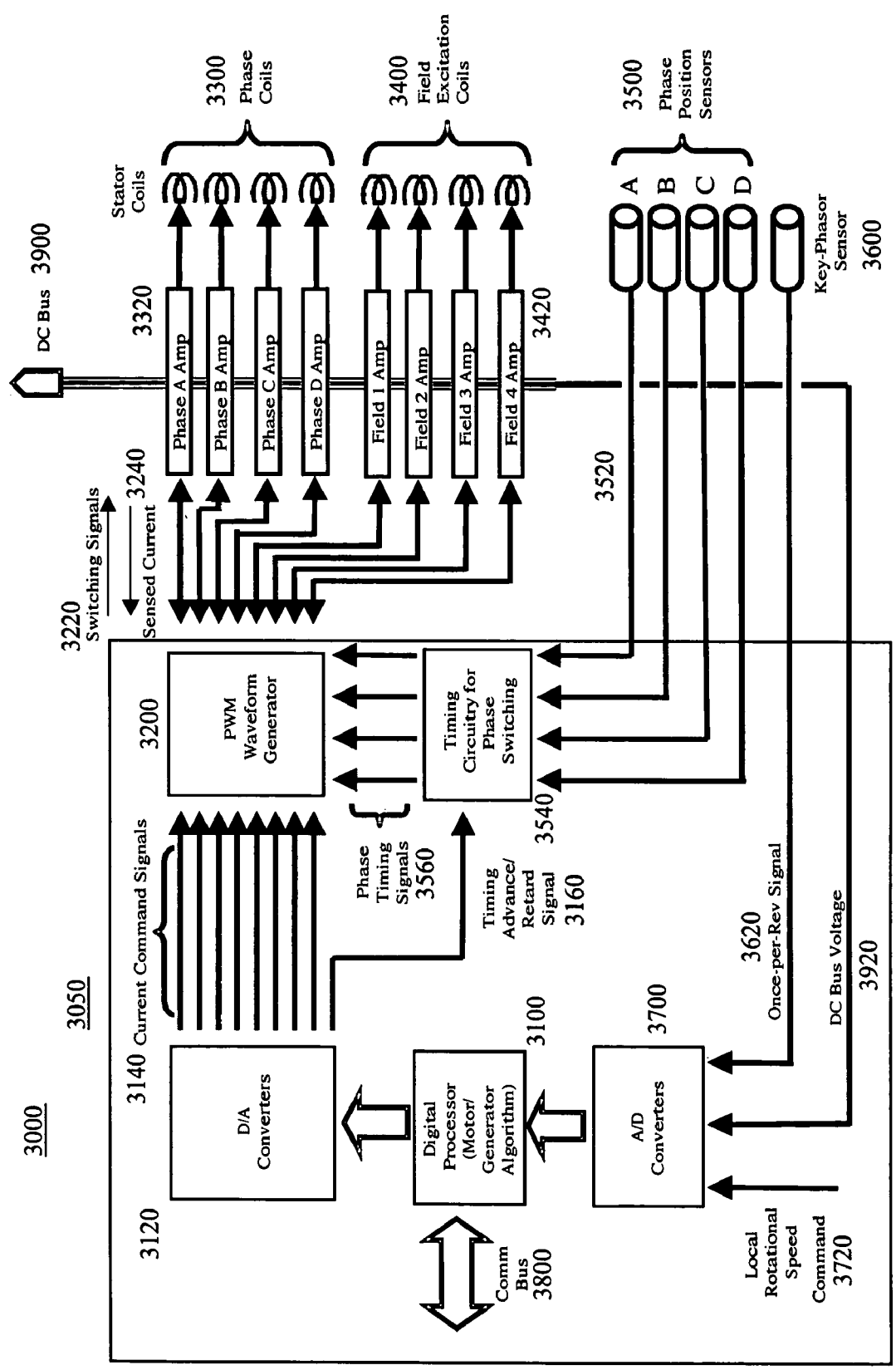
FIG. 3 is a block diagram of an exemplary embodiment of a system 3000.

FIG. 3 is a block diagram of an exemplary embodiment of a system 3000. An electronic controller 3050 can comprise a digital processor 3100 that can execute an algorithm that regulates the voltage of a DC bus 3900 when generating or regulates the rotational speed when in motoring mode. Processor 3100 can communicate with other digital hardware via a communications bus 3800, which can be a serial, parallel, and/or network interface. The data transmitted over communications bus 3800 may set the operating mode of the SRM (motor or generator), set the setpoint levels of controlled parameters such as DC bus voltage 3920 or rotational speed 3720, and/or monitor and/or report the performance of the SRM. Analog inputs, such as once-per-revolution signal 3620 and measured DC bus voltage 3920, can be wired to an analog-to-digital (A/D) converter 3700, and the resulting digital data then can be transmitted to digital processor 3100.

Based on the operating mode, setpoints, and/or measured inputs, processor 3100 can calculate the command signals 3140 for the phase amplifiers 3320 and field excitation amplifiers 3420. For phase amplifiers 3320, the current command signal can determine the upper limit (turn-off) current for each cycle of the switching signal 3320 of the phase coils 3300. For the field excitation amplifiers 3420, the command current can determine the quasi-steady current in the field coils 3400. Processor 3100 also can determine how much to advance or retard the voltage applied to phase coils 3300 relative to the sensed angular position. In general, the phase advance/retard signal 3160 will be a function of rotational speed, which can be determined from once-per-revolution signal 3620 from a key-phasor sensor 3600, and/or other parameters. Processor 3100 can transmit the results of its computations to the digital-to-analog (D/A) converters 3120, which can convert these results to analog voltages.

Each stator pole has an associated phase coil. When current is applied in that phase coil and a rotor pole is passing, there will be a torque produced which tends to align the rotor and stator poles. Therefore, as the rotor pole is moving toward a stator pole, a motoring torque is produced on the rotor. When the rotor pole is moving away from the stator pole, a generating torque is produced on the rotor. By correctly timing the current in the stator pole as a function of the rotor position, SRM can operate as either a motor or a generator. To correctly time the switching on and off the phase amplifier, a phase position sensor 3500 is included for each phase. In one implementation, this sensor is in proximity of the SRM's rotor and detects the passing of each rotor pole. By properly setting the angular alignment of this sensor relative to the corresponding stator pole, an output signal 3520 from the sensor can be applied to timing circuitry 3540 to produce a phase timing signal 3560 that can result in a switching signal 3220 for the phase amplifier 3320.

When in motoring mode, as the shaft turns and a rotor pole approaches a stator pole with a particular phase coil, the rotor pole is detected by the corresponding phase position sensor. The timing circuitry 3540 uses this position sensor signal 3520 to turn on the power transistors during the time the rotor pole is approaching the corresponding stator pole.

When in generating mode, the position sensor is again used to detect the position of the rotor pole relative to a stator pole. The phase amplifier is turned on during the time the rotor pole is moving away from the corresponding stator pole.

There will be finite time required for the phase current in a coil to ramp to its desired value once an amplifier is switched on due to the inductance of the coil. As a result, it may become necessary to modify the turn-on and turn-off angles of the phase amplifiers at high rotational speeds. Because the phase sensors are mechanically fixed relative to the stator poles, there is circuitry that can electrically advance or retard the timing signals from the phase position sensors to produce optimal switching signals for the phase amplifiers. The amount that the timing signals need to be advanced or retarded is calculated by the digital processor for all the phases and provided as a timing advance/retard signal 3160 to the timing circuitry 3540.

Also included in electronic controller 3050 can be circuitry 3200 to produce the pulse-width modulated (PWM) waveform 3220 that turns the power transistors in the amplifiers on and off. For the phase amplifiers, there is current limiting circuitry so that when the amplifiers are turned on and the current ramps up, the current does not exceed the limit that is calculated by the digital processor. For the field excitation amplifiers, the PWM waveform circuitry has electrical components to maintain the current level calculated by the digital processor. For both amplifier types, the current is sensed and these sensed signals 3240 are feedback to the PWM circuitry 3200.

Experimental Demonstration

We have experimentally demonstrated the performance of certain exemplary embodiments with a 16-pole stator and a 12-pole rotor (a 16/12 configuration). This exemplary SRM achieved a power level of 18 kW at 10,000 rpm, and was operated as a generator in the switched, unswitched, and hybrid modes of operation.

Figure 4:
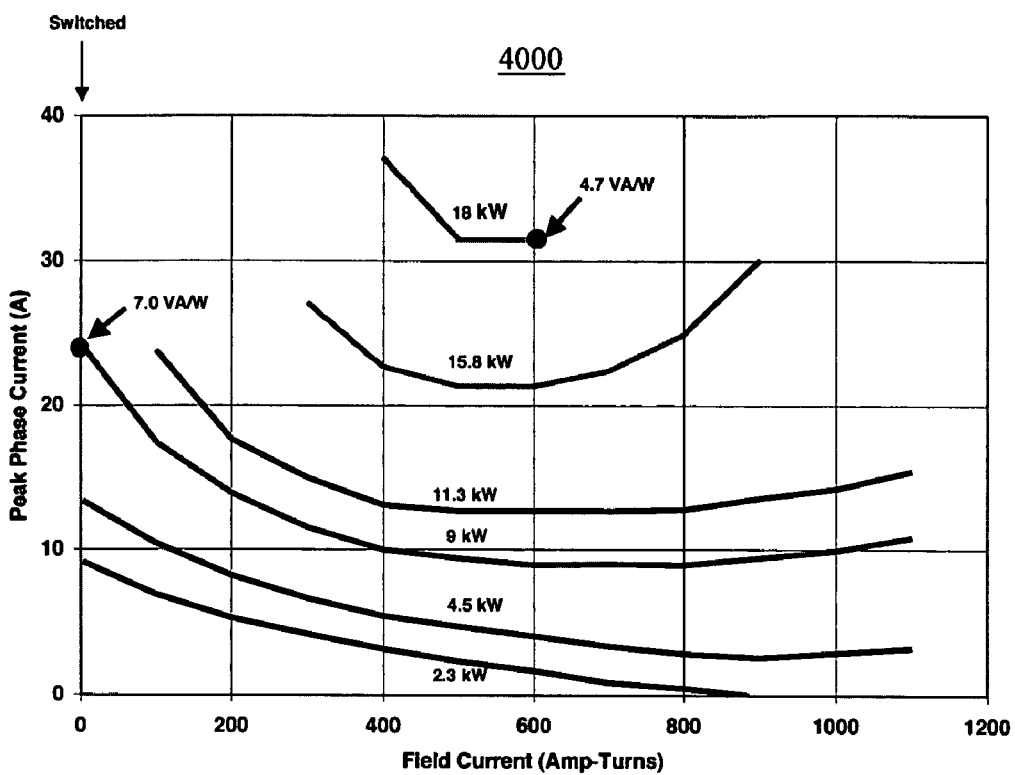
FIG. 4 is a graph 4000 of exemplary experimental data.

FIG. 4 provides a graph 4000 that shows how additional power was extracted from this exemplary SRM when operated in the hybrid mode as compared to the switched mode (conventional SRMs operate in switched mode only.) The peak current in a phase amplifier (one of eight total) is shown as a function of the amount of field excitation current, expressed as amp-turns. The data is grouped by conditions of constant power. In this way, the effect of field excitation in reducing the peak current in the amplifier is demonstrated at a given power level. In general, the size of an amplifier will scale as its volt-amp rating, so that the figure can be used to compare the required amplifier weights for the hybrid and switched configurations. One figure-of-merit is the peak volt-amps of the controller per watt of output power, expressed in VA/W. This value represents how well the volt-amp rating of the amplifier is utilized, has a theoretical minimum value of unity, and is typically around 10 for SRMs.

For a given power level, it can be seen in FIG. 4 that there is an optimum level of field excitation that minimizes the peak current in the amplifier. For instance, at a power level of 9 kW, the switched configuration (zero field current), requires about 24 A of peak current in each amplifier, and this peak current is reduced to 9 A by supplying 600 amp-turns of field excitation. By operating in this hybrid mode, the power may be increased to 18 kW, because 18 kW is consistent with 600 amp-turns, which occurs at a peak amplifier current of 32 A. This increase in power is accompanied by a favorable utilization of the amplifier, which is illustrated by the following calculations:

Switched: 24 A/phase×8 phase×330 V/9000 W=7.04 VA/W

Hybrid: 32 A/phase×8 phase×330 V/18000 W=4.69 VA/W

Because the weight of power electronics of the SRM controller can be approximately proportional to its VA rating, these calculations demonstrate that, just as for the peak volt-amps of the controller per watt of output power, the hybrid mode of operation can reduce the controller size and weight by up to about 33% or more.

Another interesting characteristic of the hybrid configuration is the improved controllability and/or stability that it can offer. When in switched mode and the SRM is operating near its maximum power conditions, an increase in load can lower ("droop") the output voltage, which can reduce the peak current in the amplifier, which can tend to further reduce the output voltage. When this occurs, the generator can shut down. Therefore, for the switched configuration, the point of maximum power can be very close to the conditions of uncontrolled shutdown of the SRM.

Figure 5:
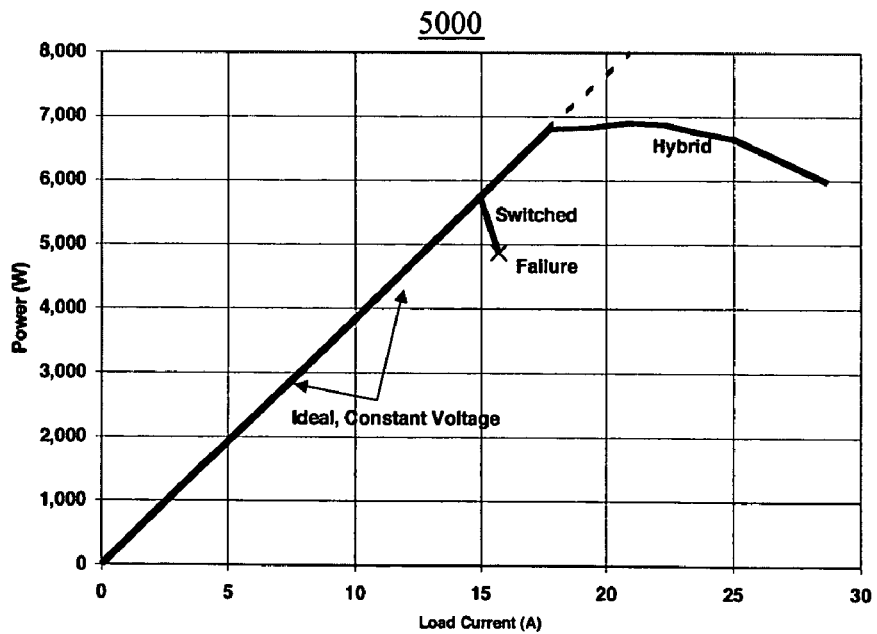
FIG. 5 is a graph 5000 of exemplary experimental data.

This effect is illustrated in FIG. 5, which provides an exemplary graph 5000 that shows how the output power varied with load current. At lower load currents, the power varied linearly with the current as the output voltage remains constant. As the current was further increased, a point of maximum power was reached, and a small increase in current resulted in shutdown of the SRM. This contrasts with the performance of the hybrid configuration, which continued to operate at higher current levels as the bus voltage drooped. Shown are operating conditions in which the current was increased 62%, at which time the voltage drooped 46%. Despite this droop, the hybrid configuration SRM continued to generate power.

To stabilize a conventional SRM in generating mode, it is typically necessary to either operate the SRM at a power level less than its maximum so that there is sufficient headroom to stably accommodate any possible overload, or to incorporate a large capacitor bank that can handle brief surges in output power without a significant droop in the bus voltage. Either of these approaches will tend to appreciably increase the weight of the system.

By contrast, when in hybrid configuration, the new SRM may be operated at or near maximum power conditions. As shown by the data in FIG. 5, when operating at this point, a further increase in current will droop the voltage, but the SRM will continue to operate over a range of currents. Therefore, the hybrid approach offers improved controllability and the ability to operate closer to point of maximum power. This translates to reduction in system weight because the SRM need not be "over-designed" to accommodate current overloads.

Radial Force

Figure 6:
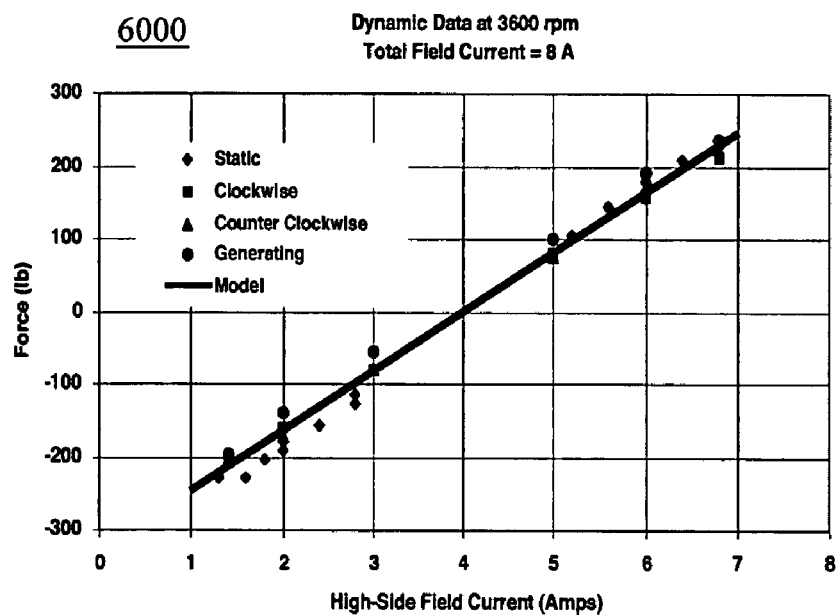
FIG. 6 is a graph 6000 of exemplary experimental data.

The unswitched and hybrid configurations of generating can produce radial force. This ability to produce radial force while generating was numerically predicted using an electromagnetic model for the SRM. This capability was also experimentally demonstrated. FIG. 6 provides a graph 6000 that shows these exemplary results, which were obtained by differentially exciting the sectors along a diameter, i.e., operating with a larger excitation in one sector than the excitation current in the opposing sector. When both sectors were excited with 4 A of current, there was no radial force produced. For this data set, the sum of the excitation currents was maintained at 8 A, i.e., as the current of the "high side" sector was raised, the current of the "low side" sector was correspondingly lowered. The measured radial force shows excellent agreement with predictions from a numerical model. Additionally, it can be seen that the results are relatively independent of shaft rotation or whether or not the generator is producing power.

Numerical Modeling of SRM

We have developed a detailed, dynamic electromagnetic numerical software model of the SRM that has been used to analyze, design, and optimize several configurations. The numerical model calculates the magnetic reluctance between each stator pole and the rotor at each instant in time using about 200 flux paths for each stator pole. The model includes finite permeability and saturation effects, stator pole-to-stator pole magnetic interaction, and predicts the dynamic performance.

Figure 7:
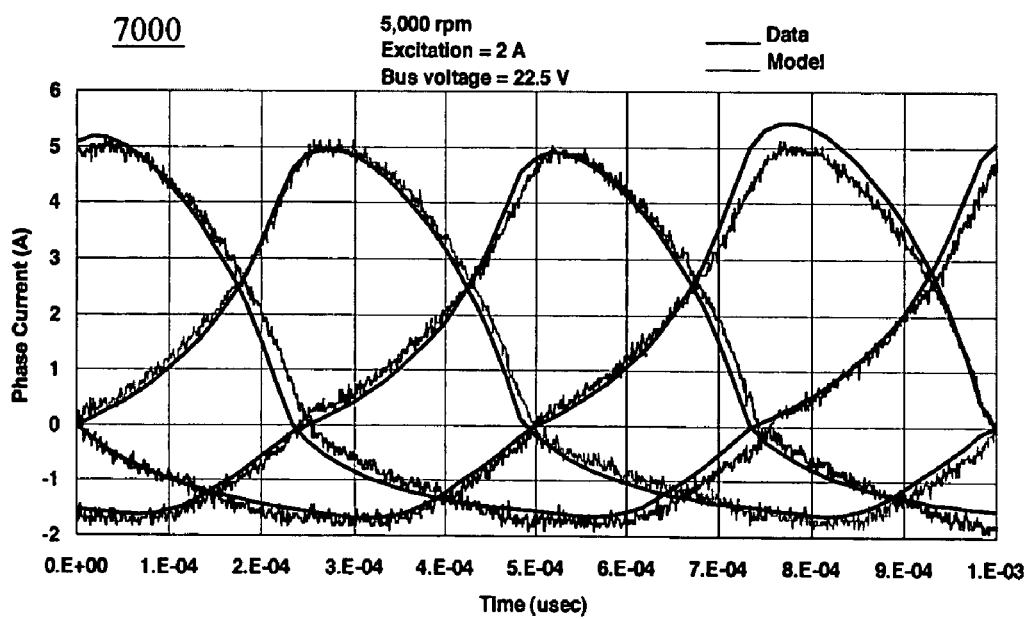
FIG. 7 is a graph 7000 of exemplary experimental data.

FIG. 7 shows a graphical comparison 7000 between a numerical model of the SRM and experimental data that were taken for the currents in the phase coils of an exemplary SRM. Data were taken at a rotational speed of 5,000 rpm for a 16/12 machine in which the 16 stator poles were grouped as 8 phases with 2 poles per phase (grouped along a diameter) and into 4 field excitation sectors of 4 poles per sector. There were 2 amp-turns of field excitation applied to each sector and the DC bus voltage was 22.5 V. Shown in the figure are the current levels in the phase coils for 4 of the phases. Note that due to the symmetry of the 16/12 machine, each of the remaining 4 phases would look like one of the 4 shown in the figure. It can be seen that the agreement between the numerical model and the experimental data is excellent.

Figure 8:
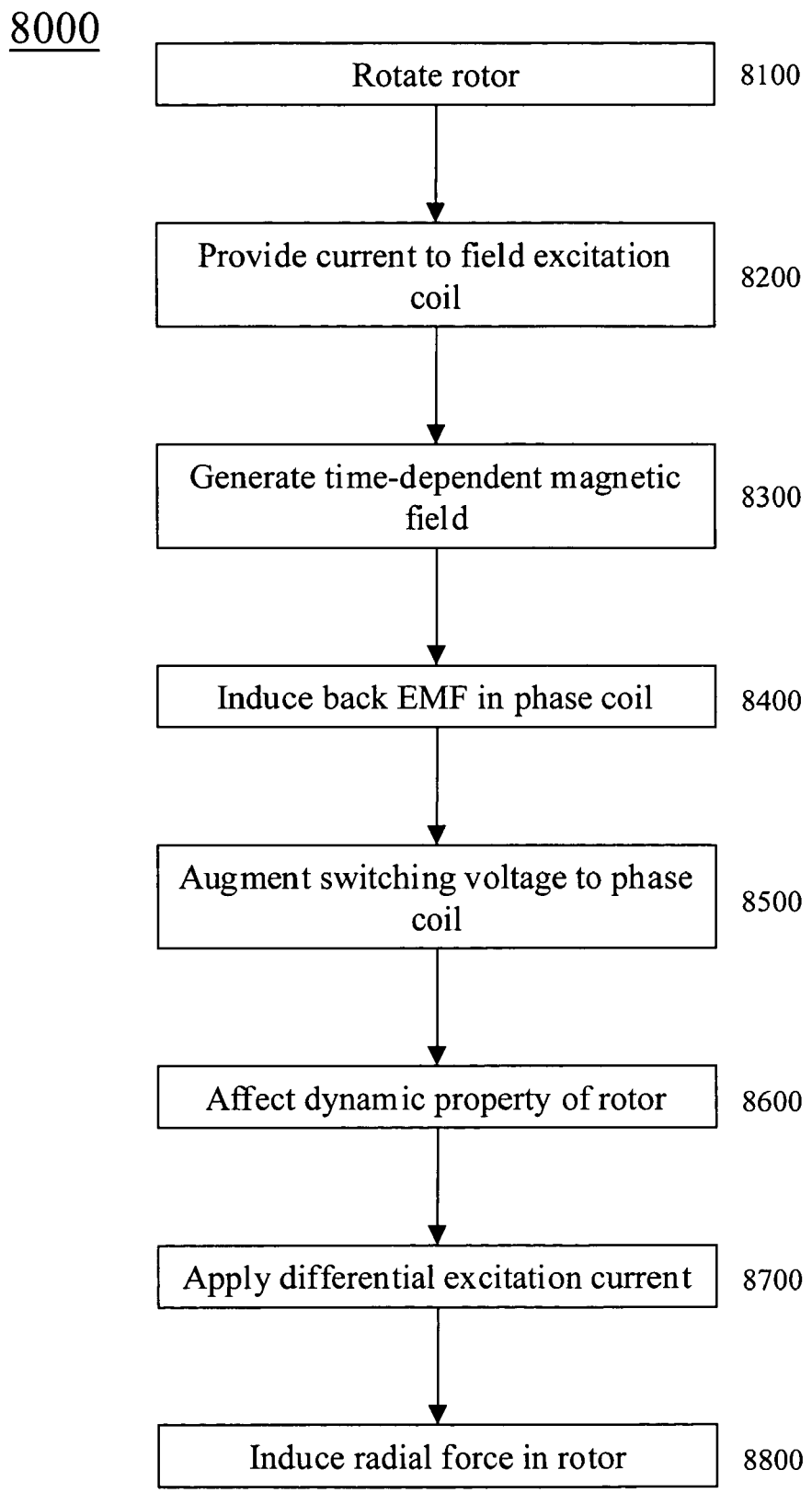
FIG. 8 is a flowchart of an exemplary method 8000.

FIG. 8 is a flowchart of an exemplary method 8000. At activity 8100, a rotor of a SRM is rotated. At activity 8200, an excitation current, such as a quasi-steady current, is provided to, and/or received by, a predetermined field excitation coil of the SRM. At activity 8300, a time-dependent magnetic field is generated by the current received in the predetermined field excitation coil. At activity 8400, a back EMF is induced in a phase coil associated with the field excitation coil. At activity 8500, via the induced back EMF, a switching voltage applied to the phase coil is augmented. The switching voltage can be associated with a non-sinusoidal and/or amplified phase switching signal that is applied to the phase coil at predetermined time and/or when the rotor is in and/or approaching a predetermined angular position, which can be determined via detection of a passing of any number of rotor poles.

At activity 8600, via the induced back EMF, the augmented phase switching signal, and/or a predetermined switching pattern of a plurality of phase coils, a rotating magnetic field can be induced in the stator that affects one or more static, rotational, and/or dynamic properties of the rotor and/or the SRM, such as a radial position, angular position, speed, acceleration, torque, power, efficiency, etc. At activity 8700, a differential excitation current can be applied to at least one pair of diametrically opposed field excitation coils, stator poles, and/or stator sectors. At activity 8800, via the differential current, a predetermined, controlled, measurable, and/or measured radial force can be induced in the rotor.

Figure 9:
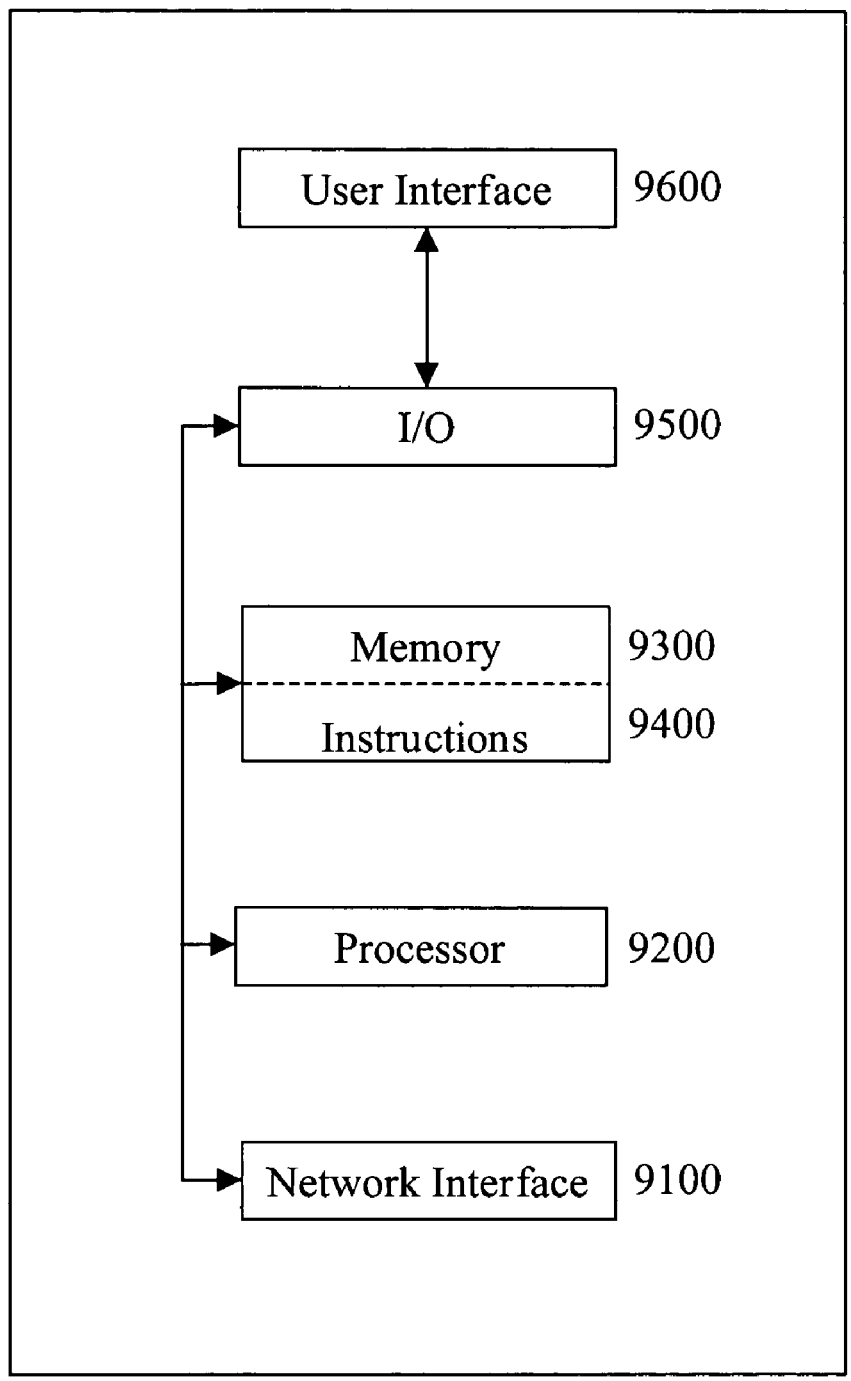
FIG. 9 is a block diagram of an exemplary information device 9000.

FIG. 9 is a block diagram of an exemplary embodiment of an information device 9000, which in certain operative embodiments can comprise and/or represent, for example, controller 3050 of FIG. 3 and/or a device for executing the instructions of the numerical software model associated with FIG. 7.

Information device 9000 can comprise any of numerous well-known components, such as for example, one or more network interfaces 9100, one or more processors 9200, one or more memories 9300 containing instructions 9400, one or more input/output (I/O) devices 9500, and/or one or more user interfaces 9600 coupled to I/O device 9500, etc. In certain exemplary embodiments, via one or more user interfaces 9600, such as a graphical user interface, a user can implement, facilitate, monitor, and/or manage an exemplary embodiment of the numerical modeling software described herein.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A switched reluctance machine, comprising
a rotor; and
a stator encircling said rotor and comprising a plurality of radially distributed stator poles, each of said stator poles comprising a co-radial set of coils, each set of coils comprising:
   a phase coil adapted to be switched non-sinusoidally to affect a rotation of said rotor; and
   a field excitation coil adapted to, while said rotor is rotating, generating a time-dependent magnetic field from a received excitation current;
said plurality of radially distributed stator poles grouped into at least three sectors, each sector comprising a neighboring sub-plurality of said stator poles and a neighboring sub-plurality of said field excitation coils, said neighboring sub-plurality of said field excitation coils electrically connected in series, said received excitation current of each of said sectors independently controllable, each phase coil in a given sector assigned a different phase from each other phase coil in a said given sector; and
an electronic controller configured to operate the switched reluctance machine (SRM) as a motor/generator, in one of a plurality of operating modes comprising:
   a switched mode, wherein current in the field excitation coils is zero, and the SRM operates as a conventional SRM.

2. The switched reluctance machine of claim 1, wherein for each set of coils, said field excitation coil and said phase coil are centered along a radius of said stator.

3. The switched reluctance machine of claim 1, wherein said rotor comprises a plurality of rotor poles.

4. The switched reluctance machine of claim 1, wherein each of said phase coils is electrically coupled to a power amplifier.

5. The switched reluctance machine of claim 1, wherein each of said field excitation coils is adapted to create a magnetomotive force between the stator pole corresponding to said field excitation coil and said rotor.

6. The switched reluctance machine of claim 1, wherein said field excitation coils in each sector are electrically connected in series.

7. The switched reluctance machine of claim 1, wherein said excitation current is quasi-steady.

8. The switched reluctance machine of claim 1, wherein when said excitation current is applied to at least a subgroup of said field excitation coils and said rotor is rotating, a back EMF is induced in at least a subgroup of said phase coils.

9. The switched reluctance machine of claim 1, wherein when said excitation current is applied to at least a subgroup of said field excitation coils and said rotor is rotating, a time-dependent back EMF is induced in at least a subgroup of said phase coils.

10. The switched reluctance machine of claim 1, wherein a radial force is produced when a differential excitation current is applied to at least one diametrically opposed pair of said field excitation coils.

11. The switched reluctance machine of claim 1, wherein when a differential excitation current is applied to at least one pair of said field excitation coils, said at least one pair opposingly positioned on a line segment collinear with an outer diameter of said stator, a radial force is produced along said line segment.

12. The switched reluctance machine of claim 1, further comprising a plurality of angular position sensors adapted to determine an angular position of said rotor.

13. The switched reluctance machine of claim 1, further comprising a processor adapted to provide command signals to a plurality of phase amplifiers, each of said phase amplifiers coupled to at least one of said phase coils.

14. The switched reluctance machine of claim 1, further comprising a processor adapted to provide command signals to a plurality of field excitation amplifiers, each of said field excitation amplifiers coupled to at least one of said field excitation coils.

15. The switched reluctance machine of claim 1, further comprising a processor adapted to provide command signals to a plurality of phase amplifiers, each of said phase amplifiers coupled to at least one of said phase coils, the command signals adapted to determine a turn-off current for each of a plurality of phase switching cycles.

16. The switched reluctance machine of claim 1, further comprising a processor adapted to provide command signals to a plurality of field excitation amplifiers, each of said field excitation amplifiers coupled to at least one of said field excitation coils, the command signals adapted to cause a current in said at least one of said field excitation coils.

17. The switched reluctance machine of claim 1, further comprising a processor adapted to determine an amount to advance or retard a voltage applied to at least a subgroup of said phase coils relative to a sensed angular position of said rotor.

18. The switched reluctance machine of claim 1, further comprising a processor adapted to receive an angular position signal from a phase position sensor and to determine an amount to advance or retard a voltage applied to at least a subgroup of said phase coils relative to a sensed angular position of said rotor.

19. The switched reluctance machine of claim 1, further comprising a phase position sensor located substantially adjacent said rotor.

20. The switched reluctance machine of claim 1, further comprising a phase position sensor located substantially adjacent said rotor and adapted to detect a passing of each of a plurality of rotor poles.

21. The switched reluctance machine of claim 1, further comprising a phase position sensor located substantially adjacent said rotor and adapted to detect a passing of each of a plurality of rotor poles and to generate a corresponding switching signal for a phase amplifier.

22. The switched reluctance machine of claim 1, further comprising a controller adapted to determine an amount to advance or retard a voltage applied to at least a subgroup of said phase coils relative to a sensed angular position of said rotor.

23. The switched reluctance machine of claim 1, wherein the plurality of operating modes further comprises:
a hybrid mode where current is applied to the field excitation coils.

24. The switched reluctance machine of claim 1, wherein the plurality of operating modes further comprises:
an unswitched mode where current is applied to the field excitation coils and the phase coils are not actively switched.

* * * * *